US010236937B2

(12) United States Patent
Sabetti et al.

(10) Patent No.: US 10,236,937 B2
(45) Date of Patent: *Mar. 19, 2019

(54) MANAGING CONTACTLESS COMMUNICATIONS (71) Applicant: GOOGLE LLC, Mountain View, CA (US)

(72) Inventors: Anthony J. Sabetti, Murphy, TX (US); Jason S. Qian, Dallas, TX (US); Larry L. Bush, O'Fallon, MO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,796

(22) Filed: Oct. 27, 2017

(65) Prior Publication Data

US 2018/0062706 A1    Mar. 1, 2018

Related U.S. Application Data

(63) Continuation of application No. 14/925,964, filed on Oct. 28, 2015, now Pat. No. 9,819,396.

(60) Provisional application No. 62/069,517, filed on Oct. 28, 2014.

(51) Int. Cl.
*H04B 5/00* (2006.01)
*H04W 4/80* (2018.01)
*H04W 76/14* (2018.01)

(52) U.S. Cl.
CPC ............ *H04B 5/0031* (2013.01); *H04W 4/80* (2018.02); *H04W 76/14* (2018.02)

(58) Field of Classification Search
CPC .. H04B 5/0031; H04W 4/008; H04W 76/023; H04W 4/80; H04W 76/14
USPC ................................................ 455/41.1, 41.2
See application file for complete search history.

(56) References Cited

U.S. PATENT DOCUMENTS

| 9,357,332 | B2 * | 5/2016 | Tang | H04W 4/003 |
| 9,408,075 | B2 * | 8/2016 | Wang | G06Q 20/32 |
| 9,436,939 | B2 * | 9/2016 | Royyuru | G06Q 20/405 |
| 9,479,571 | B2 * | 10/2016 | Gargiulo | H04L 67/10 |
| 9,491,626 | B2 * | 11/2016 | Sharma | H04W 12/12 |

(Continued)

OTHER PUBLICATIONS

U.S. Appl. No. 14/925,964 to Sabetti et al. filed Oct. 28, 2015.

(Continued)

*Primary Examiner* — Lewis G West
(74) *Attorney, Agent, or Firm* — Johnson, Marcou & Isaacs, LLC (57) ABSTRACT

Communicating via near field communication (NFC) between a reader and an application on an NFC-enabled device. A point of sale (POS) device and a consumer's mobile communication device establish an NFC session in accordance with each of the protocol layers of both International Organization for Standardization (ISO)/International Electrotechnical Commission (IEC) 14443 and ISO/IEC 7816 standards. A commerce application executing on the consumer's mobile communication device at a protocol layer above the ISO/IEC 14443 and ISO/IEC 7816 standards communicates a plurality of NFC application protocol data units (APDUs) to the POS device. At least one such APDU includes a consumer identifier. The consumer identifier includes a portion identifying the commerce application.

15 Claims, 6 Drawing Sheets

(56) References Cited

U.S. PATENT DOCUMENTS

| | | | |
|---|---|---|---|
| 2008/0306849 A1* | 12/2008 | Johnson, Jr. | G06F 21/35 |
| | | | 705/35 |
| 2010/0190437 A1* | 7/2010 | Buhot | H04B 5/06 |
| | | | 455/41.1 |
| 2010/0207742 A1* | 8/2010 | Buhot | H04B 5/06 |
| | | | 340/10.51 |
| 2012/0109764 A1* | 5/2012 | Martin | G06Q 20/204 |
| | | | 705/17 |
| 2012/0317628 A1* | 12/2012 | Yeager | G06Q 20/204 |
| | | | 726/5 |
| 2013/0054474 A1* | 2/2013 | Yeager | G06Q 20/3223 |
| | | | 705/71 |
| 2013/0300385 A1* | 11/2013 | Li | H02M 3/07 |
| | | | 323/271 |
| 2016/0119031 A1 | 4/2016 | Sabetti et al. | |

OTHER PUBLICATIONS

Gesesse, "U.S. Office Action issued in copending U.S. Appl. No. 14/925,964, filed Oct. 28, 2015", dated Dec. 6, 2016, 10 pages.
Gesesse, "U.S. Office Action issued in copending U.S. Appl. No. 14/925,964, filed Oct. 28, 2015", dated Apr. 26, 2017, 14 pages.
Gesesse, "U.S. Office Action issued in copending U.S. Appl. No. 14/925,964, filed Oct. 28, 2015", dated Jul. 7, 2016, 9 pages.

* cited by examiner

100

| Layer | Standard |
|---|---|
| Application Layer | Commerce application 160 |
| Application Protocol | ISO/IEC 7816-4 APDUs 150 |
| Transmission Protocol | ISO/IEC 14443-4 140 |
| Initialization and Anticollision | ISO/IEC 14443-3 130 |
| RF Power and Signal Interface | ISO/IEC 14443-2 120 |
| Physical Characteristics | ISO/IEC 14443-1 110 |

Establish, by a point of sale (POS) device and a consumer's mobile communication device, an NFC session between the POS device and the consumer's mobile communication device in accordance with each of the protocol layers of both International Organization for Standardization (ISO)/ International Electrotechnical Commission (IEC) 14443 and ISO/IEC 7816 standards
420

Communicate to the POS device during the NFC session, by a commerce application executing on the consumer's mobile communication device at a protocol layer above the ISO/IEC 14443 and ISO/IEC 7816 standards, a plurality of NFC application protocol data units (APDUs), at least one APDU comprising a consumer identifier, the consumer identifier comprising a portion identifying the commerce application
430

Establish, by one or more computing devices, the portion of the consumer identifier identifying the commerce application
510

Establish, by a point of sale (POS) device and a consumer's mobile communication device, an NFC session between the POS device and the consumer's mobile communication device in accordance with each of the protocol layers of both International Organization for Standardization (ISO)/ International Electrotechnical Commission (IEC) 14443 and ISO/IEC 7816 standards
420

Communicate to the POS device during the NFC session, by a commerce application executing on the consumer's mobile communication device at a protocol layer above the ISO/IEC 14443 and ISO/IEC 7816 standards, a plurality of NFC application protocol data units (APDUs), at least one APDU comprising a consumer identifier, the consumer identifier comprising a portion identifying the commerce application
430

MANAGING CONTACTLESS COMMUNICATIONS

CROSS REFERENCE TO RELATED APPLICATIONS

This application is a continuation of and claims priority to U.S. patent application Ser. No. 14/925,964 filed Oct. 28, 2015, and entitled "Managing Contactless Communications," which claims the benefit of U.S. Provisional Application No. 62/069,517, filed Oct. 28, 2014 and entitled "Systems, Methods, and Computer Program Products for Managing Contactless Communications." The complete disclosure of the above-identified priority applications is hereby fully incorporated herein by reference.

TECHNICAL FIELD

The technology disclosed herein relates to near field communication (NFC). Example embodiments relate to communicating via NFC between an NFC reader and an NFC-enabled application available on a NFC-enabled user computing device.

BACKGROUND

NFC is a short-range radio frequency (RF) communication technology, typically operating at a distance of 10 cm or less between two communicating devices. Communication via NFC involves an initiator device (often referred to as a "reader") and a target device.

In a simple NFC communication configuration, the reader can generate an RF field that can power a target that does not require batteries. This configuration enables use of an NFC target having a simple form, such as a tag, a sticker, a key fob, or a smart card. Simple NFC targets are typically read-only and directed to a single application, for example, a single-purpose contactless smart card used for payment in connection with a credit card account. In addition to payment, NFC targets have applications in areas such as ticketing, access, RF identification (RFID) tags, loyalty programs, and coupons.

In a more sophisticated NFC communication configuration, the NFC target can be emulated by using a secure element (SE) installed in a "host" device, such as a smartphone. An SE is a tamper-resistant hardware platform, capable of securely running SE applications and storing confidential and cryptographic data. An SE can be included in the subscriber identity module (SIM) or universal integrated circuit card (UICC) of a mobile device (the host) as an embedded SE (eSE). An SE can also be installed in a secure digital (SD) card that can be inserted into a mobile device. An NFC controller in the mobile device handles communication between the SE and an NFC reader. Such an arrangement allows the SE to emulate a smart card.

Host-based card emulation (HCE), more often simply "Host Card Emulation," is a technology that allows an NFC-enabled host device, such as a smartphone, to appear as an NFC target to an NFC reader, without relying on a conventional passive NFC target or an SE. In a typical HCE implementation, the NFC controller, also referred to as a contactless front end (CLF), can interface with an application running under the operating system (OS) of the host. For example, a smartphone can run a mobile wallet payment application under the phone's OS. The mobile wallet payment application can communicate with an NFC-enabled point of sale (POS) device via the CLF.

Before the introduction of HCE, requests coming from a contactless reader to communicate with an NFC application in a mobile device were routed to the active SE. HCE implementations must take into account the possible coexistence of NFC card emulation services on an SE and in the host OS. This coexistence requires the CLF to be able to identify the appropriate NFC-enabled application by identifying the environment (for example, SE in a UICC, HCE, eSE) under which the application is available.

One way to accomplish such routing is by using an NFC application identifier (AID). The CLF on the device maintains a routing table that lists AIDs for the applications on the device. When the CLF receives a request to select an application ("SELECT AID" command) from a reader, the CLF searches for the AID in its routing table. If it finds the AID in the CLF routing table, the CLF will route the command to the correct SE or the host OS. A typical application identifier (AID) includes up to sixteen 8-bit bytes.

SUMMARY

Embodiments of the technology disclosed herein provide systems, methods, and computer program products to communicate via NFC between an NFC reader and an NFC-enabled application available on a NFC-enabled user mobile computing device. In such embodiments, NFC reader and a user's mobile computing device establish an NFC session in accordance with each of the multiple protocol layers of both International Organization for Standardization (ISO)/International Electrotechnical Commission (IEC) 14443 and ISO/IEC 7816 standards. An NFC application executing on the user's mobile computing device at a protocol layer above the ISO/IEC 14443 and 7816 standards communicates a plurality of NFC application protocol data units (APDUs) to the NFC reader. At least one such APDU includes a user identifier. The user identifier includes a portion identifying the NFC application.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
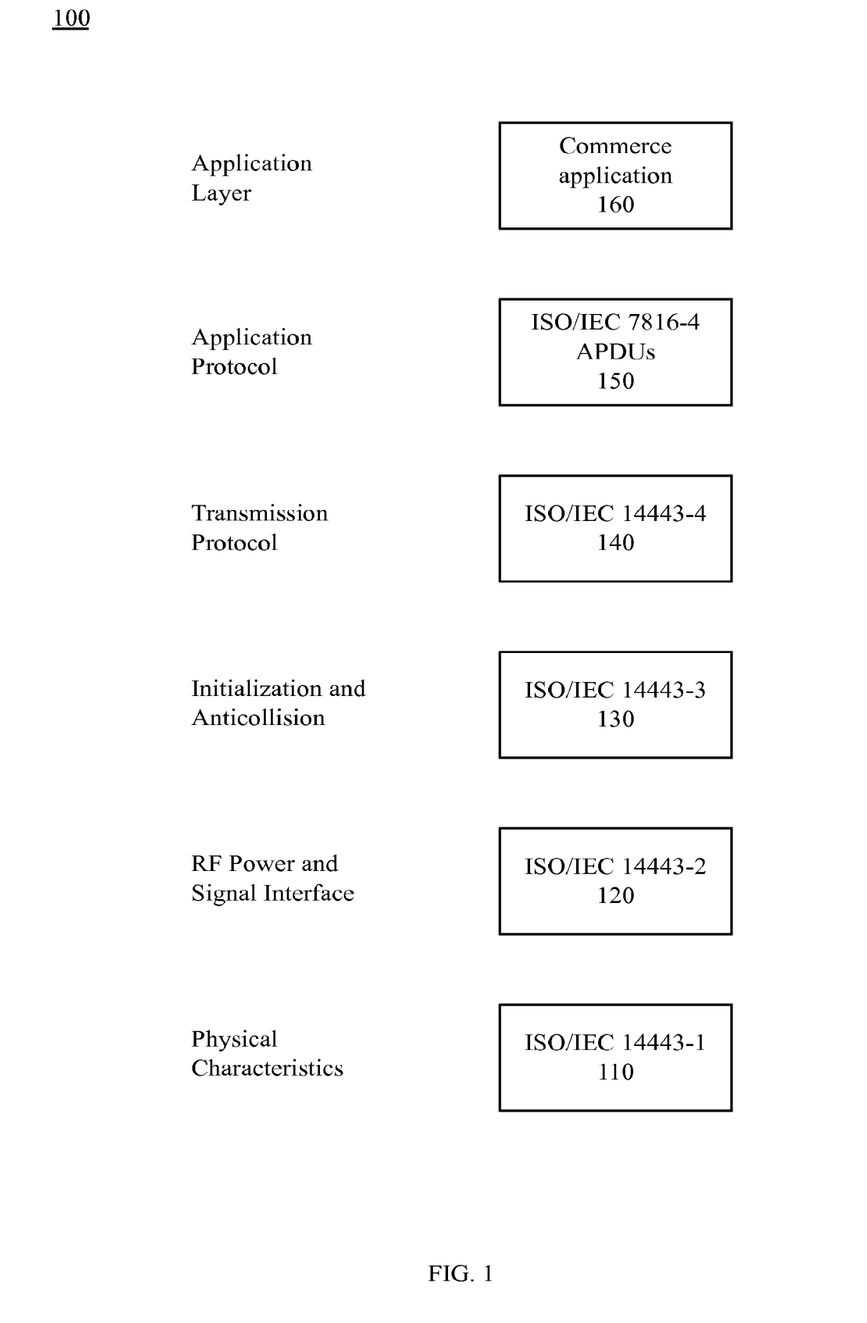
FIG. 1 is a diagram depicting a portion of a protocol stack for NFC communication.

A set of protocols published in standards established by a joint committee of the International Organization for Standardization (ISO) and the International Electrotechnical Commission (IEC) describe NFC communications through the first five layers of what can be characterized as a seven-layer protocol stack. Referring to FIG. 1, a portion of the protocol stack 100 associated with NFC Type 4 tags—the tag type typically associated with HCE operation—is shown.

ISO/IEC 14443-1 (item 110) specifies the physical characteristics of proximity cards such as NFC smart cards. In the case of HCE operations, most of the content of this part of the standard is not directly applicable. ISO/IEC 14443-2 (item 120) specifies the characteristics of the fields to be provided for power and bi-directional communication between readers and targets. ISO/IEC 14443-3 (item 130) defines the initialization and anti-collision protocols. In particular, ISO/IEC 14443-3 describes: polling for targets entering the field of a reader; the byte format, the frames and timing used during the initial phase of communication between readers and targets; and the initial Request and Answer to Request command content. ISO/IEC 14443-3 further describes: methods to detect and communicate with one target among several targets (anti-collision); other polling parameters required to initialize communications between a target and a reader; and optional means to ease and speed up the selection of one target among several targets based on application criteria. ISO/IEC 14443-4 (item 140) specifies transmission protocols that can be used between a reader and a target. In particular, ISO/IEC 14443-4 specifies a half-duplex block transmission protocol and defines the activation and deactivation sequence of the protocol.

ISO/IEC 7816-4 (item 150) specifies contents of command-response pairs exchanged between readers and targets, means of retrieval of data elements and data objects in the target, and structures and contents of historical bytes to describe operating characteristics of the target. ISO/IEC 7816-4 further specifies: structures for applications and data in the target as seen at the interface when processing commands, access methods to files and data in the target, and a security architecture defining access rights to files and data in the target. In addition, ISO/IEC 7816-4 describes: means and mechanisms for identifying and addressing applications in the target through use of AIDs, methods for secure messaging, and access methods to the algorithms processed by the target.

It is not uncommon for a commerce application provider, such as a retail merchant, to develop a consumer-facing portion and a merchant-specific business rules portion of an NFC-enabled commerce application 160 while licensing or purchasing both the underlying NFC-infrastructure portion (such as the functions addressed by the standards cited above) and a generic business rules portion from a second party. The generic business rules portion can address both payment aspects (such as interfacing with established credit card payment networks) and other commerce aspects (such as presenting consumer-specific offers, tracking loyalty program participation, and interacting through social media).

When the second party registers an AID for the underlying NFC-infrastructure portion and the generic business rules portion, it can be challenging for an NFC reader to distinguish between applications of individual commerce application providers. Further, it can be challenging for the second party to be informed of use of its application by commerce application providers, for example, for determining licensing fees.

Embodiments of the technology disclosed herein include methods, systems, and computer program products for NFC contactless communication that can be used to decouple identification of specific commerce application providers from the AID of a common underlying NFC infrastructure portion and a generic business rules portion provided by a second party other than the commerce application provider.

By using and relying on the technology described herein, the commerce application provider can deploy a commerce application 160 having an identifier decoupled from the underlying AID, and the second party can determine usage without having to register an AID for each and every deployment. As such, the technology described herein may be employed to field a wide variety of NFC enabled applications based on a common underlying NFC infrastructure and general application-specific rules (for example, access application-specific rules). Hence, commerce application developers can manage application development costs.

Example System Architectures

In example architectures for the technology, while some devices shown in the architecture are represented by one instance of the device, in some cases multiple instances of each device can be used. Further, while certain aspects of operation of the present technology are presented in examples related to the figures to facilitate enablement of the claimed invention, additional features of the present technology, also facilitating enablement of the claimed invention, are disclosed elsewhere herein.

Figure 2:
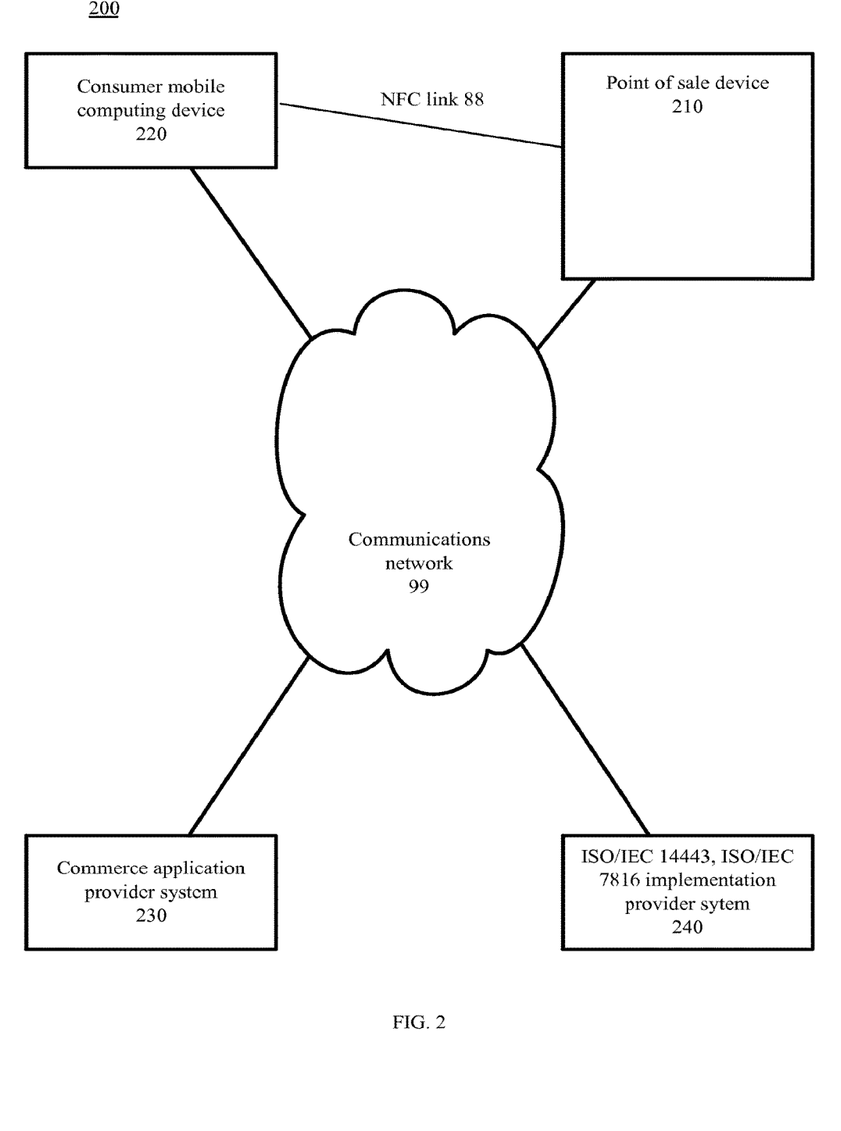
FIG. 2 is a block diagram depicting a communications and processing architecture in accordance with certain example embodiments.

Referring to FIG. 2, an example architecture 200 for managing contactless communication is illustrated. As depicted in FIG. 2, the architecture 200 includes network computing devices 210, 220, 230, and 240; each of which may be configured to communicate with one another via communications network 99. In addition, network devices 220 and 210 are configured to communicate over NFC link 88.

Network 99 includes one or more wired or wireless telecommunications means by which network devices may exchange data. For example, the network 99 may include one or more of a local area network (LAN), a wide area network (WAN), and an intranet. Network 99 may include an Internet, a storage area network (SAN), a personal area network (PAN), a metropolitan area network (MAN), a wireless local area network (WLAN), a virtual private network (VPN), a cellular or other mobile communication network, a BLUETOOTH wireless technology connection, a near field communication (NFC) connection. Network 99 may include, any combination thereof, and any other appropriate architecture or system that facilitates the communication of signals, data, and/or messages.

Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, a desktop computer, a laptop computer, a tablet computer, a television with one or more processors embedded therein and/or coupled thereto, a smartphone, a handheld computer, a personal digital assistant (PDA), a smartcard (or a smartphone operating in Host Card Emulation mode), or any other wired or wireless processor-driven device. In the example embodiment depicted in FIG. 2, a merchant may operate network device 210. A consumer may operate network device 220. A commerce application provider may operate device 230. An NFC commerce infrastructure developer may operate network device 240.

The network connections illustrated are example and other means of establishing a communications link between the computers and devices can be used. Moreover, those having ordinary skill in the art having the benefit of the present disclosure will appreciate that the network devices illustrated in FIG. 2 may have any of several other suitable computer system configurations. For example, consumer device 220 may be embodied as a mobile phone or handheld computer may not include all the components described above.

Figure 3:
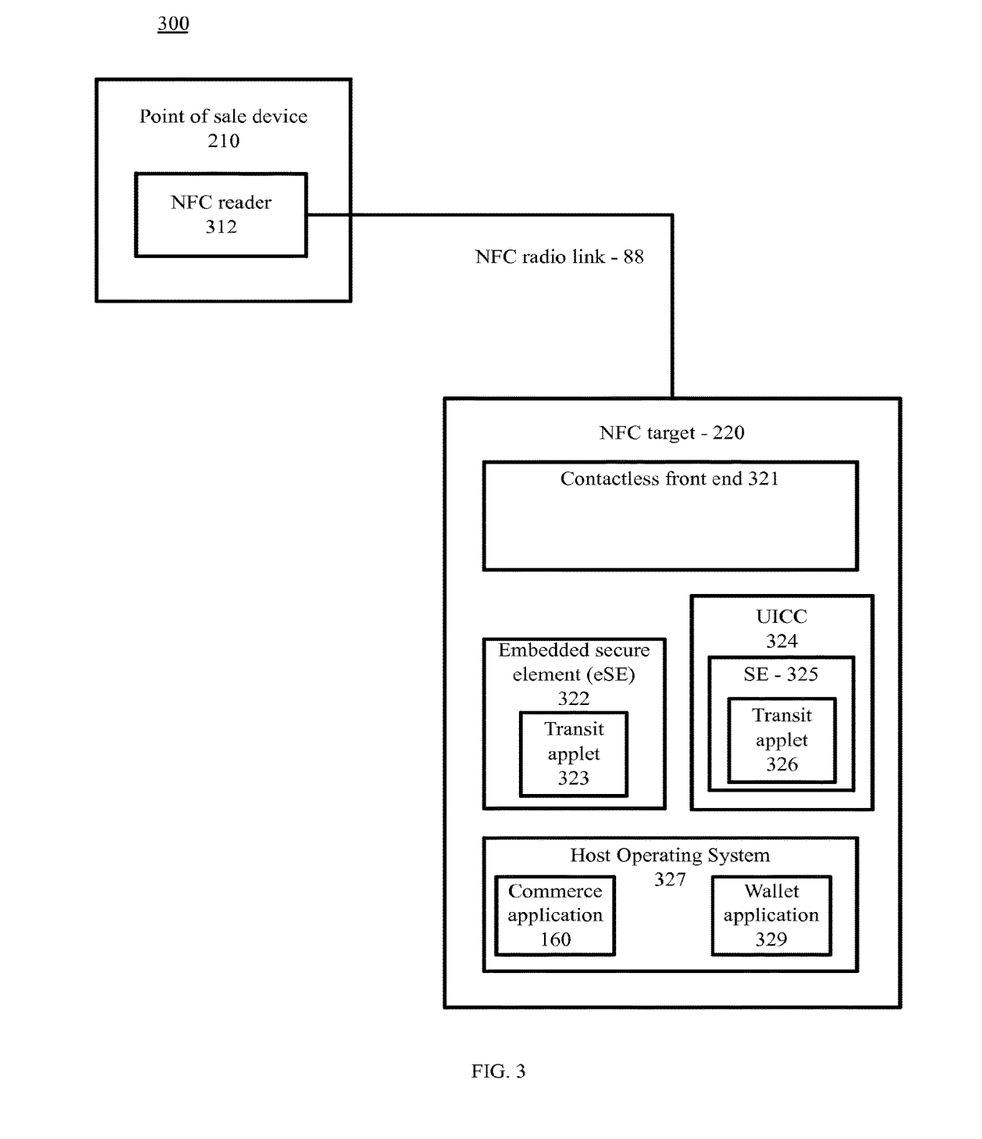
FIG. 3 is a block diagram depicting a communications and processing architecture in accordance with certain example embodiments.

Referring to FIG. 3, details 300 of the NFC connection depicted in FIG. 1 between the POS device 210 and the NFC target (for example, a consumer's smartphone) 220 are shown. The POS device 210 and the NFC target 220 can be in communication over an NFC radio link 88 when the NFC target 220 is in close proximity (typically <10 cm) to the POS device 210.

The POS device 210 includes an NFC reader 312 operable to generate an RF field that supports an NFC radio link 88 with an NFC target 220. The NFC reader 312 is then operable to communicate with the NFC target 220 to execute operations, such as a payment transaction, control of access, loyalty program transaction, promotional distribution, and verification of identity. While the example architecture 300 includes an NFC reader 312 as part of a POS device 210, other architectures employing the present technology include an NFC reader 312 outside of a POS device 210.

The NFC target 220 can include a contactless front end (CLF) 321, an embedded SE 322, a UICC 324 containing a second SE 325, and a host operating system 327 supporting an HCE environment (not explicitly shown). The CLF 321 interacts with the lower levels of the NFC protocol (for example, the physical layer) of the NFC radio link 88, allowing the NFC target 220 to communicate with the NFC reader 212. The CLF 321 includes procedures that can establish, configure, and maintain the NFC target 220, and that can react to messages from the NFC Reader 212, the eSE 322, the SE 325 within the UICC 324, and from one or more HCE applications in the host operating system 327. As described above, the CLF 321 can use an AID-based routing table to route NFC messages, each message called an Application Program Data Unit (APDU), between the POS device 210 and an NFC application, for example, transit applet 323 running on the eSE 322. In some embodiments, a user associated with one or both of the POS device 210 and the NFC target 220 must install an application and/or make a feature selection to obtain the benefits of the technology described herein. Transit applets 323 and 326 run respectively on eSE 322 and UICC-embedded SE 325. Both a commerce application 160 (such as a loyalty card application) and a wallet application 329 run in the HCE environment under the host operating system 327.

Throughout the discussion of example embodiments, it should be understood that the terms "data" and "information" are used interchangeably herein to refer to text, images, audio, video, or any other form of information that can exist in a computer-based environment. Additionally, those having ordinary skill in the art and having the benefit of this disclosure will appreciate that the elements illustrated in FIG. 2 and FIG. 3 may have any of several other suitable computer system configurations. For example, the NFC target 220 can be embodied as a mobile phone or handheld computer. In some embodiments, a merchant can operate the POS device 210, and the NFC target 220 can be a smartphone operated by a customer.

Figure 6:
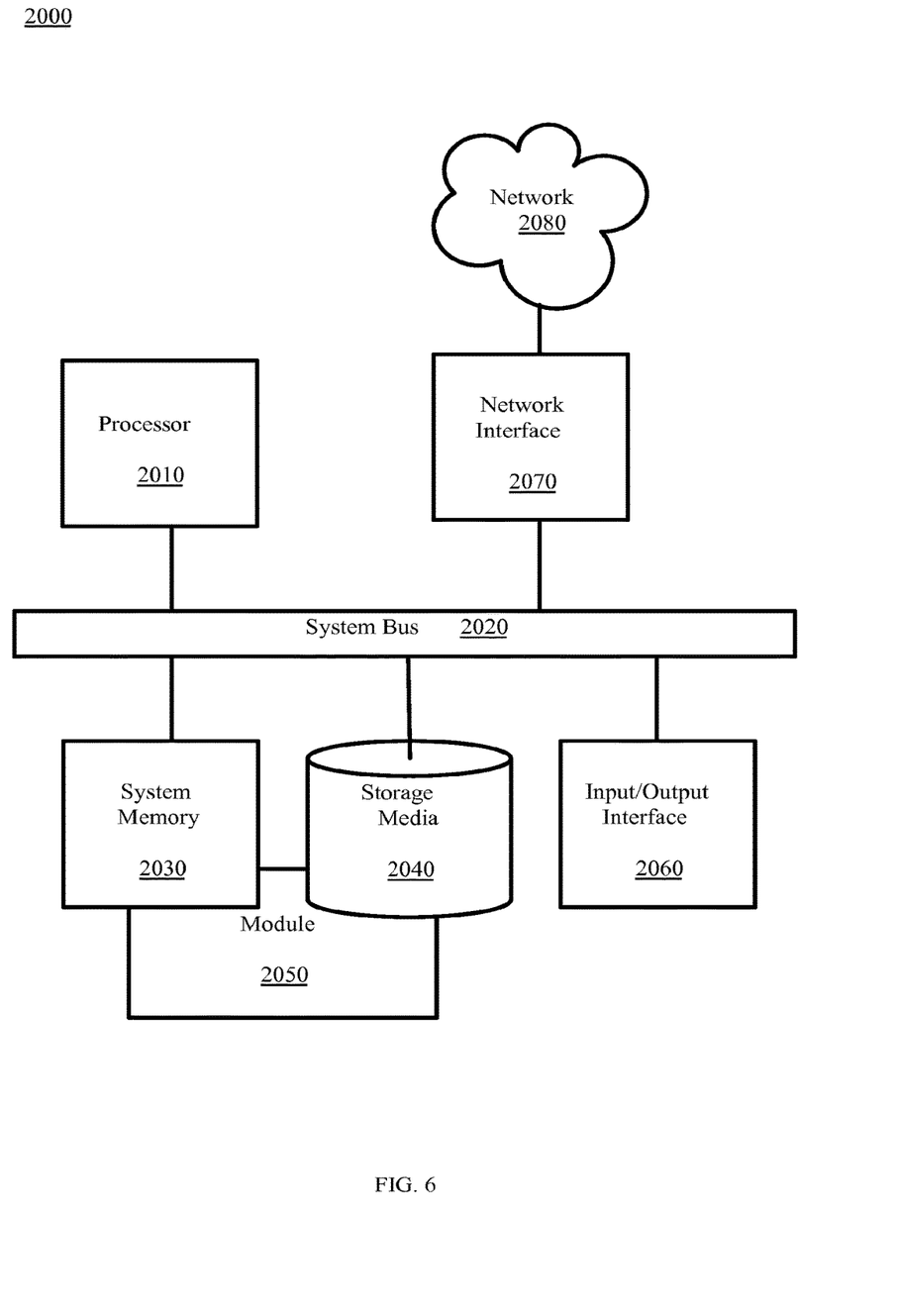
FIG. 6 is a block diagram depicting a computing machine and a module, in accordance with certain example embodiments.

In example embodiments, the devices associated with the technology presented herein may be any type of computing machine such as, but not limited to, those discussed in more detail with respect to FIG. 6. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 6. The computing machines discussed herein may communicate with one another, as well as with other computing machines or communication systems over one or more networks, such as network 99. The network 99 may include any type of data or communications network, including any of the network technology discussed with respect to FIG. 6. The computing machines discussed herein may communicate with one another as well as other computing machines or communication systems over one or more other networks in addition to the NFC radio link 88 (for example, over the Internet for provisioning).

Example Embodiments

Figure 4:
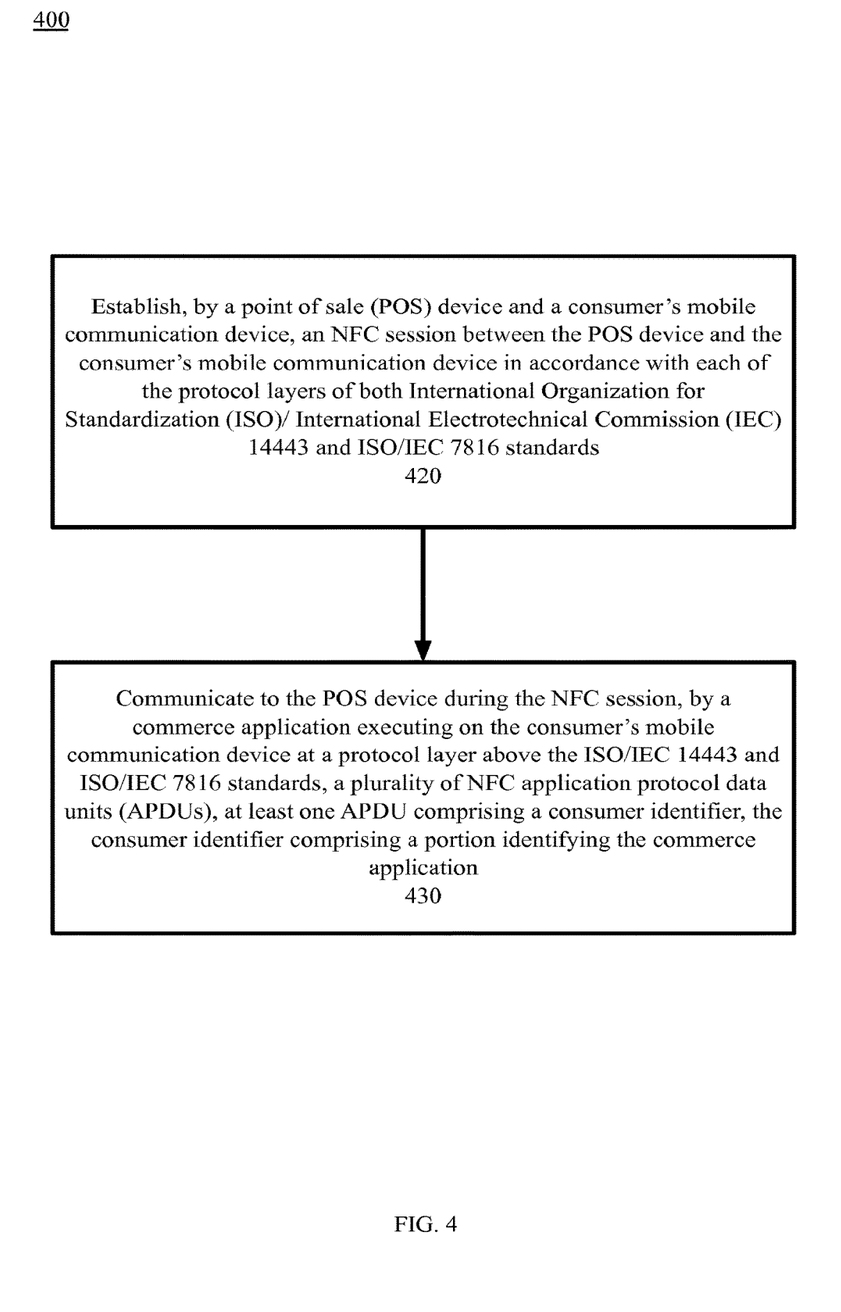
FIG. 4 is a block flow diagram a block flow diagram depicting methods 300 for communicating via NFC between a user computing device (such as a smartphone) and an NFC reader, in accordance with certain example embodiments.
Figure 5:
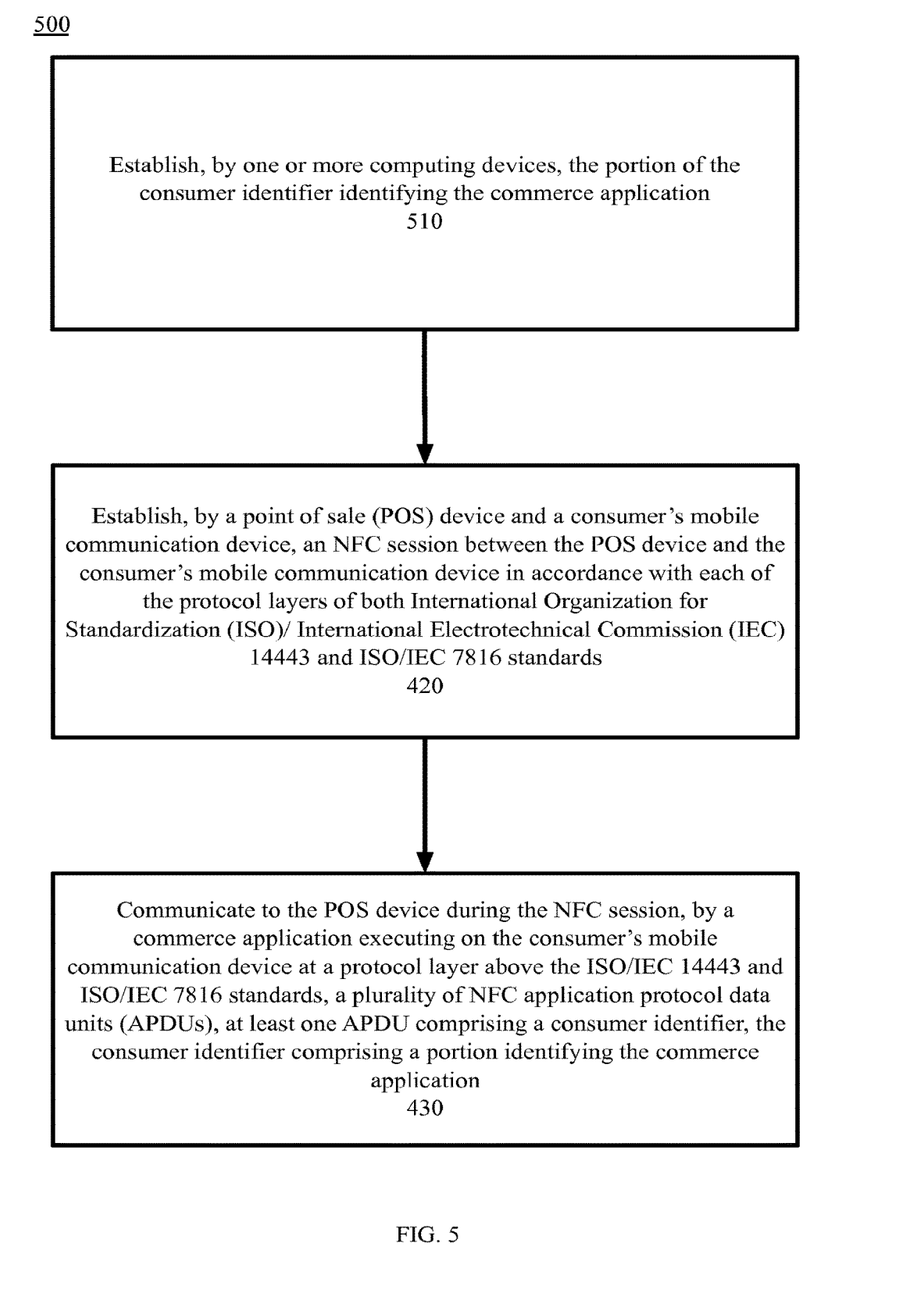
FIG. 5 is a block flow diagram a block flow diagram depicting methods 300 for communicating via NFC between a user computing device (such as a smartphone) and an NFC reader is shown, in accordance with certain example embodiments.

The example methods illustrated in FIGS. 4-5 are described hereinafter with respect to the components of FIG. 2 and FIG. 3. The example methods can also be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 4, and continuing to refer to prior figures for context, a block flow diagram depicting methods 400 for communicating via NFC between a user computing device (such as a smartphone) and an NFC reader is shown, in accordance with certain example embodiments. In such methods, an NFC session is established by a POS device and a consumer's mobile communication device in accordance with each of the protocol layers of both International Organization for Standardization (ISO)/International Electrotechnical Commission (IEC) 14443 and ISO/IEC 7816 standards—Block 420. As a continuing example, consider a retail merchant that develops a commerce application 160. The retail merchant develops a consumer-facing portion of the commerce application 160—the user interface. The commerce application 160 provides payment, loyalty program, and offer distribution functions when installed in the host operating system 327 of a consumer's smartphone 220. The retail merchant licenses, from a second party on a per-user basis, the underlying NFC-infrastructure portion of the commerce application 160 (such as the functions addressed by the standards cited above), and a generic business rules portion that handles both payment aspects (such as interfacing with established credit card payment networks through a POS device 210), and other commerce aspects (such as presenting consumer-specific offers, tracking loyalty program participation, and interacting through social media).

The commerce application executing on the consumer's mobile communication device, communicates a plurality of NFC application protocol data units (APDUs) to the POS device during the NFC session at a protocol layer above the ISO/IEC 14443 and ISO/IEC 7816 standards—Block 430. At least one of the communicated APDUs includes a consumer identifier. The consumer identifier includes a portion identifying the commerce application. In the continuing example, an APDU communicated by the commerce application 160 to the POS device 210 includes 16-byte consumer ID, four bytes of which identify the commerce application 160.

In some embodiments, the portion of the consumer identifier identifying the commerce application 160 can identify the commerce application provider, for example, by using a common set of bits to identify all commerce applications 160 distributed by the provider, and a unique set of bits for each application. In some embodiments, the consumer identifier uses the last six bytes of the consumer identifier to identify the consumer. In some embodiments, the consumer identifier includes a geographic region identifier, for example, to indicate a geographic region in which the commerce application 160 can be used. In some embodiments, each APDU communicated from the commerce application 160 to the POS device 220 includes the commerce application portion of the consumer identifier.

Referring to FIG. 5, and continuing to refer to prior figures for context, a block flow diagram depicting methods 500 for communicating via NFC between a user computing device (such as a smartphone) and an NFC reader is shown, in accordance with certain example embodiments. In such embodiments, Block 420 and Block 430 can be performed as described in connection with FIG. 4. In such methods, prior to establishing the NFC session in accordance with the standards, one or more computing devices can establish the portion of the consumer identifier identifying the commerce application—Block 510. In the continuing example, the second party, the entity supplying instructions executing on the user's mobile communication device that established the NFC session in accordance with the standards, uses its system 240 to establish the portion of the consumer identifier identifying the commerce application 160. In some embodiments, the commerce application 160 provider, such as the retail merchant, uses its system 230 to establish the portion of the consumer identifier identifying the commerce application 160.

Consider as an additional example, a commerce application 160 developed by a grocery retailer and intended for use on a consumer's smartphone 220 for payments, to receive coupons, and for the user to interact with the grocery retailer's loyalty program. The grocery retailer brands the commerce application 160 with the look and feel of a user interface developed in-house, but licenses most of the remaining functionality from a second party. The remaining functionality includes the underlying NFC-infrastructure (such as the functions addressed by the standards cited above), and a business rules portion that handles interfacing with established credit card payment networks through a POS device 210, presenting consumer-specific offers, and interfacing with the grocery retailer's loyalty program. In this example, the commerce application 160 provider sets the portion of the consumer identifier identifying the commerce application to "A7BC" (in hexadecimal notation—equivalent to two bytes in length). The second party has required all licensees to select a commerce application identifier portion of the consumer identifier that starts with "A."

When the consumer enters the grocer's retail location and taps her NFC-enabled smartphone 210 to a POS device 220, at the lower levels of the protocol stack the second party portions of the commerce application 160 perform NFC connection functions as described with regard to the standards discussed elsewhere herein. Each APDU passed from the consumer's smartphone 210 to the POS device 220 contains the "A7BC" commerce application identifier. The second party can be notified that a commerce application built on second party licensed software is in use (because of the leading "A" in the commerce application 160 identifier), and the grocery retailer can be notified that the commerce application 160 is in use (because of the "A7BC" commerce application identifier). For example, the NFC reader 220 can use network 99 to communicate use of second party licensed software having the identifier "A**" via an e-mail or other messaging protocol. Such an approach can be used to manage licensing of the second party software without relying on a unique AID RID.

Other Example Embodiments

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area WAN, local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, while example embodiments disclosed herein include an SE in an UICC, an eSE, and HCE, the present technology can be implemented in devices no including one or more of these technologies, and can be implemented in devices including other secure technologies such as an SE in a microSD card hosted by a device such as a smartphone.

We claim:

1. A computer-implemented method to communicate via near field communication (NFC), comprising:
   establishing, by an NFC reader and a user's mobile communication device, an NFC session between the NFC reader and the user's mobile communication device in accordance with each of multiple protocol layers of one or more of International Organization for Standardization (ISO)/International Electrotechnical Commission (IEC) 14443 and ISO/IEC 7816 standards; and
   communicating to the NFC reader during the NFC session, by an NFC-enabled application executing on the user's mobile communication device at a protocol layer above the ISO/IEC 14443 and 7816 standards, a plurality of NFC application protocol data units (APDUs), at least one of the APDUs comprising an identifier indicating a source of instructions executing on the user's mobile communication device that established the NFC session, and an identifier indicating the NFC-enabled application.

2. The method of claim 1, further comprising, prior to establishing the NFC session, establishing, by one or more computing devices, the identifier indicating the NFC-enabled application.

3. The method of claim 2, wherein the one or more computing devices establishing the NFC-enabled application identifier comprises a computing device of an entity supplying instructions executing on the user's mobile communication device that established the NFC session.

4. The method of claim 2, wherein the one or more computing devices establishing the user identifier identifying the NFC-enabled application comprises a computing device of an entity supplying the NFC-enabled application.

5. The method of claim 1, wherein each communicated APDU comprises a user identifier, the user identifier comprising the identifier indicating the NFC-enabled application.

6. A computer program product, comprising:
   a non-transitory computer-readable storage device having computer-executable program instructions embodied thereon that when executed by a computer cause the computer to communicate via near field communication (NFC), the computer-executable program instructions comprising:
   computer-executable program instructions to establish, by a point of sale (POS) device and a consumer's mobile communication device, an NFC session between the POS device and the consumer's mobile communication device in accordance with each of the protocol layers of one or more of International Organization for Standardization (ISO)/International Electrotechnical Commission (IEC) 14443 and ISO/IEC 7816 standards; and
   computer-executable program instructions to communicate to the POS device during the NFC session, by a commerce application executing on the consumer's mobile communication device at a protocol layer above the ISO/IEC 14443 and ISO/IEC 7816 standards, a plurality of NFC application protocol data units (APDUs), at least one of the APDUs comprising an identifier indicating a source of instructions executing on the user's mobile communication device that established the NFC session, and an identifier indicating the commerce application.

7. The computer program product of claim 6, wherein the computer-executable program instructions further comprise computer-executable program instructions to establish, prior to establishing the NFC session, by one or more computing devices, the identifier identifying the commerce application.

8. The computer program product of claim 7, wherein the one or more computing devices establishing the commerce application identifier comprises a computing device of an entity supplying instructions executing on the user's mobile communication device that established the NFC session in accordance with the standards.

9. The computer program product of claim 7, wherein the one or more computing devices establishing the commerce application identifier comprises a computing device of an entity supplying the commerce application.

10. The computer program product of claim 6, wherein each communicated APDU comprises the consumer identifier, the consumer identifier comprising the identifier indicating the commerce application.

11. A system to communicate via near field communication (NFC), comprising:
a storage device; and
a processor communicatively coupled to the storage device, wherein the processor executes application code instructions that are stored in the storage device to cause the system to:
establish, by a point of sale (POS) device and a consumer's mobile communication device, an NFC session between the POS device and the consumer's mobile communication device in accordance with each of the protocol layers of one or more of International Organization for Standardization (ISO)/International Electrotechnical Commission (IEC) 14443 and ISO/IEC 7816 standards; and
communicate to the POS device during the NFC session, by a commerce application executing on the consumer's mobile communication device at a protocol layer above the ISO IEC 14443 and ISO/IEC 7816 standards, a plurality of NFC application protocol data units (APDUs), at least one of the APDUs comprising an identifier indicating a source of instructions executing on the user's mobile communication device that established the NFC session, and an identifier indicating the commerce application.

12. The system of claim 11, wherein the computer-executable program instructions further comprise computer-executable program instructions to establish, prior to establishing the NFC session, by one or more computing devices, the identifier indicating the commerce application.

13. The system of claim 12, wherein the one or more computing devices establishing the commerce application identifier comprises a computing device of an entity supplying instructions executing on the user's mobile communication device that established the NFC session.

14. The system of claim 12, wherein the one or more computing devices establishing the commerce application identifier comprises a computing device of an entity supplying the commerce application.

15. The system of claim 11, wherein each communicated APDU comprises the consumer identifier, the consumer identifier comprising the identifier indicating the commerce application.

* * * * *